(12) United States Patent
Thai et al.

(10) Patent No.: US 8,804,622 B1
(45) Date of Patent: Aug. 12, 2014

(54) WIRELESS ACCESS POINTS WITH MODULAR ATTACHMENTS

(75) Inventors: Chris Thai, Oakland, CA (US); Steve Grau, Pleasanton, CA (US); Nozar Azarakhsh, Modesto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 40 days.

(21) Appl. No.: 13/341,180

(22) Filed: Dec. 30, 2011

(51) Int. Cl.
*H04W 4/00* (2009.01)
(52) U.S. Cl.
USPC .......................................... 370/328; 370/338
(58) Field of Classification Search
USPC .......................................... 370/338, 310, 328
See application file for complete search history.

(56) References Cited

U.S. PATENT DOCUMENTS

| 7,643,894 | B2 * | 1/2010 | Braithwaite et al. ............. 700/94 |
| 2010/0034178 | A1 * | 2/2010 | Bhar .............................. 370/338 |
| 2010/0057969 | A1 * | 3/2010 | Meiri et al. .................... 710/303 |

* cited by examiner

*Primary Examiner* — Andrew Lee
(74) *Attorney, Agent, or Firm* — Harrity & Harrity, LLP (57) ABSTRACT

A wireless access point may include a processor to communicate with a management device over a network; a wired Ethernet interface to the network; and a wireless interface to connect, using a local wireless protocol, to one or more client computing devices, where the wireless access point provides an access point for the one or more client computing devices to connect to the network. The wireless access point may further include an interface to provide a local connection to a modular device, where the processor is to transmit, over the network, data received from the modular device to the management device or data received from the management device to the modular device; and a housing to contain the processor, the wired Ethernet interface, the wireless interface, and the interface to provide the local connection.

20 Claims, 7 Drawing Sheets

WIRELESS ACCESS POINTS WITH MODULAR ATTACHMENTS

BACKGROUND

A wireless access point (AP) may be a device that allows wireless devices to connect to a wired network using WiFi, Bluetooth, or another local wireless networking standard. A mobile device such as a laptop, smartphone, or tablet computer may be configured to automatically connect to a wireless access point when the mobile device is in range of a compatible wireless access point.

A wireless access point may have a relatively short range, such as about 20 meters. However, multiple overlapping wireless access points may be used to cover relatively large areas. For example, a commercial premises such as a hospital, airport, or retail outlet, may install a network of wireless access points throughout the premises. Mobile devices, of users moving throughout the premises, may automatically switch to an in-range wireless access point, to thereby provide the users with seamless network connectivity throughout the premises.

SUMMARY

According to one aspect, a device may include a processor to receive audio data from a management device connected to a network; a wired Ethernet interface to the network; a wireless interface to connect, using a local wireless protocol, to one or more client computing devices, where the device provides an access point for the one or more client computing devices to connect to the network; a housing to contain the wired Ethernet interface and the wireless interface; and a speaker, integrated into the housing, where the processor controls the speaker to broadcast the received audio data.

According to another aspect, a device may include a processor to communicate with a management device over a network; a wired Ethernet interface to the network; a wireless interface to connect, using a local wireless protocol, to one or more client computing devices, where the device provides an access point for the one or more client computing devices to connect to the network; an interface to provide a local connection to a modular device, where the processor is to transmit, over the network, data received from the modular device to the management device or data received from the management device to the modular device; and a housing to contain the processor, the wired Ethernet interface, the wireless interface, and the interface to provide the local connection.

According to yet another aspect, a system may include a management device; and a number of wireless access points, controlled by the management device, to provide wireless access, to a network, for client devices. Each of the wireless access points may include: a processor to communicate with the management device; a wired Ethernet interface to the network; a wireless interface to connect to the client devices; an interface to provide a local connection to a modular device, where the processor is to transmit, over the network, data received from the modular device to the management device or data received from the management device to the modular device, and where the interface provides power to the modular device; and a housing to contain the processor, the wired Ethernet interface, the wireless interface, and the interface to provide the local connection.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A system and/or method, as described herein, may relate to a wireless access point that includes a built-in or easily attachable speaker. A network of such wireless access points, deployed in a customer premises, may allow for music and/or audio announcements to be broadcast throughout the customer premises.

In some implementations, additional devices or functionality may be included as a modular attachment to a wireless access point. The additional devices/functionality may include, for example, security devices, cameras, microphones, motion detection devices, gas detection devices (e.g., $CO_2$, natural gas, etc.), thermometers, or other devices/functionality. The speaker and other devices/functionality that are associated with the wireless access points may be controlled from a management device that is normally used to control the wireless (e.g., WiFi) functionality of the wireless access points.

Figure 1:
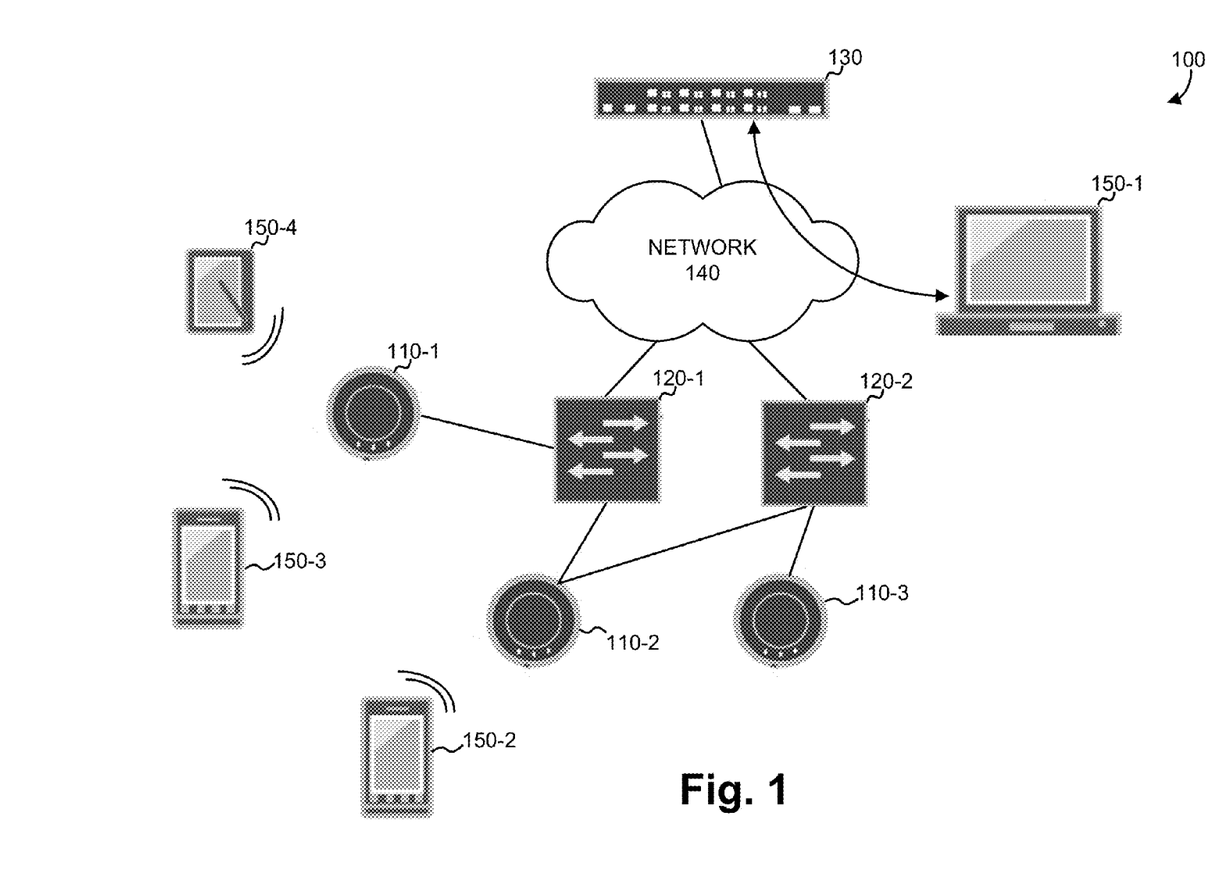
FIG. 1 is a diagram of an example system in which concepts described herein may be implemented.

FIG. 1 is a diagram of an example system 100 in which concepts described herein may be implemented. As shown, system 100 may include wireless access points 110-1, 110-2, and 110-3, switches 120-1 and 120-2, a management device 130, a network 140, and client computing devices 150-1, 150-2, 150-3, and 150-4. System 100 may be implemented in a premises, such as a residential or business premises. In one example, system 100 may be implemented in a relatively large-sized premises in which it is desired to provide wireless coverage over the entire premises using a relatively short range wireless network standard. For example, system 100 may be used to provide WiFi coverage to an airport, a hospital, a school, a business office, etc.

Wireless access points 110 may provide wireless network access to one or more computing devices 150 and may connect, such as through a wired connection, to a network, such as network 140. Wireless access points 110 may provide wireless access using a local wireless protocol such as WiFi, Bluetooth, Zigbee, or another wireless protocol. Wireless access points 110 may be deployed in indoor and/or outdoor environments. In some implementations, in addition to providing wireless points of contact for a network, wireless access points 110 may provide other networking services such as traffic encryption, security, spectrum analysis, traffic forwarding, optimization services for applications such as Voice over Internet Protocol (VoIP), or other network-related services.

Switches 120 may include switches, routers, hubs, network bridges, or combinations of these network elements that connect wireless access points 110 to network 140. Switches 120 may process data at the data link (layer 2) layer and/or the network layer (layer 3) of the Open Systems Interconnection (OSI) model. Switches 120 may include Ethernet-based switches. In one implementation, switches 120 may implement Power over Ethernet (PoE) to pass electrical power over Ethernet cabling provided to wireless access points 110. With PoE, relatively few wires may be needed to connect wireless access points 110. In particular, only a single Ethernet cable may need to be installed to each wireless access point 110, where the single cable may carry both data and electrical power.

Switch 120, and/or other elements of network 140, may, in some implementations, be associated with battery backup power. This may allow switch 120, and wireless access points 110, to continue to function in the event of a power failure at the premises.

Management device 130 may operate to manage and/or control portions of system 100, such as wireless access points 110. Management device 130 may, for example, configure parameters for wireless access points 110. In some implementations, wireless access points 110 may provide status information to management device 130, such as a list of the currently connected computing devices 150. Management device 130 may provide an interface, such as a graphical or textual interface (e.g., a display device), through which an administrator can configure or view the state of wireless access points 110. For example, as shown in FIG. 1, computing device 150-1 may connect to management device 130, through which an administrator may configure parameters of wireless access points 110-1, 110-2, or 110-3.

Network 140 may include one or more networks of any type, such as a local area network (LAN), a wide area network (WAN), a metropolitan area network (MAN), a telephone network, such as the Public Switched Telephone Network (PSTN), a Public Land Mobile Network (PLMN), or a cellular network, an intranet, the Internet, or a combination of networks. In one particular implementation, network 140 may be a local area network that includes network infrastructure to provide network connectivity to computing devices 150. Although wireless access points 110, switches 120, and management device 130 are illustrated in FIG. 1 as implemented externally to network 140, in some implementations, one or more of these devices may be included within network 140.

Computing devices 150 may each include a portable or desktop computing device. Computing devices 150 may include, for instance, a personal computer, a wireless telephone, a personal digital assistant (PDA), a laptop, a smart phone, a tablet computer, or another type of computation and communication device.

Although FIG. 1 shows example components of system 100, in other implementations, system 100 may include fewer components, different components, differently arranged components, or additional components than depicted in FIG. 1. Alternatively, or additionally, one or more components of system 100 may perform one or more tasks described as being performed by one or more other components of system 100. For simplicity, three wireless access points 110, two switches 120, a management device 130, and four computing devices 150 are illustrated in system 100. In practice, there may be additional or fewer of these devices.

Figure 2:
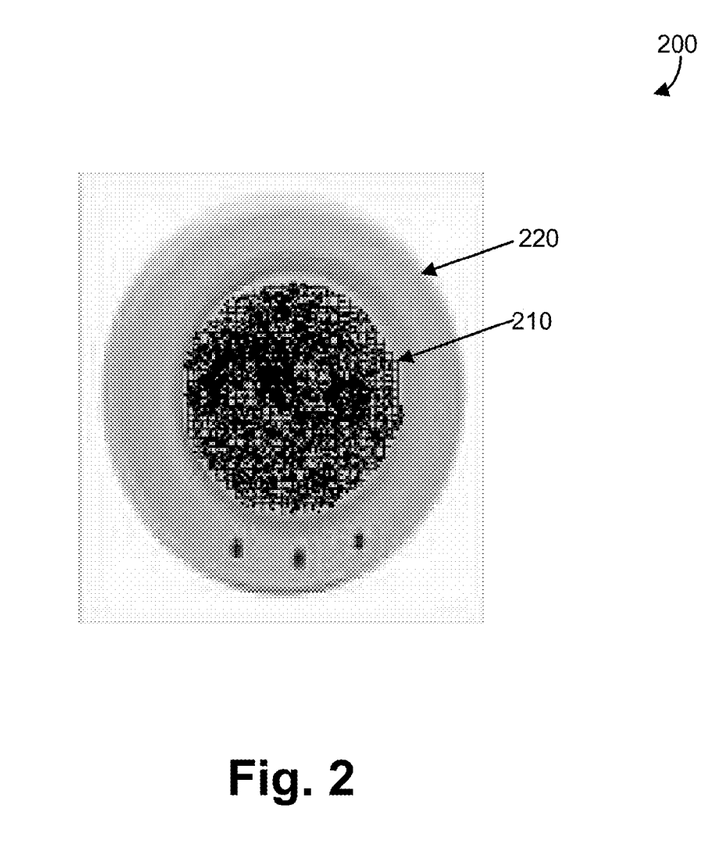
FIG. 2 is a diagram illustrating an example physical housing of a wireless access point.

FIG. 2 is a diagram illustrating an example physical housing 200 of a wireless access point 110. Housing 200 may include a speaker 210 disposed in a central portion of housing 200. Housing 200 may additionally include an outer circular ring 210, such as a hollow plastic ring, where electrical components of wireless access point (described in more detail with reference to FIG. 3) may be placed. Housing 200 may generally be designed so that it can be installed relatively unobtrusively in a customer premises, such as a housing that can be mounted on a wall, ceiling, in the plenum area above ceiling tiles, or on or underneath a table top. Thus, housing 200 may be provided in variety of sizes and/or shapes.

Figure 3:
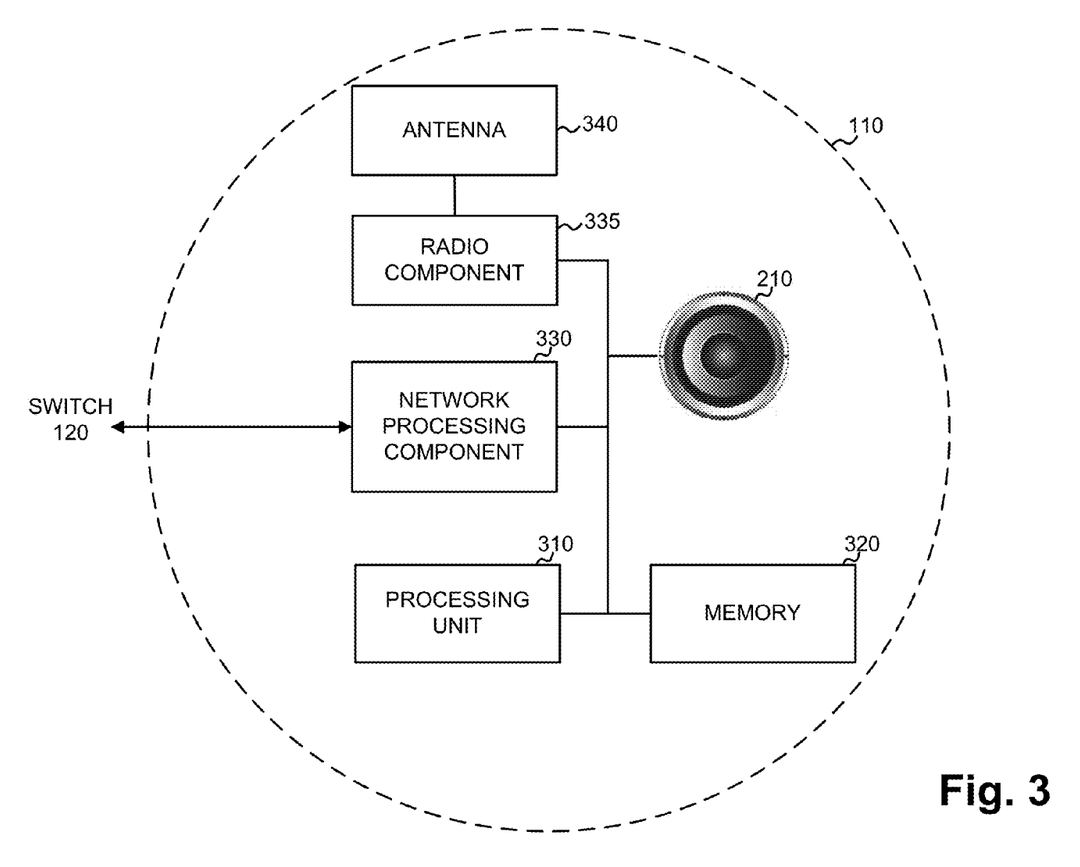
FIG. 3 is a diagram illustrating example components of the wireless access point.

FIG. 3 is a diagram illustrating example components of wireless access point 110. As illustrated, wireless access point 110 may include a processing unit 310, a memory 320, a network processing component 330, radio component 335, an antenna 340, and a speaker 210. The components shown in FIG. 3 may be implemented within housing 200 (FIG. 2).

Processing unit 310 may include one or more processors or microprocessors that interpret and execute instructions. Additionally or alternatively, processing unit 320 may be implemented as or include one or more application specific integrated circuits (ASICs), field programmable gate arrays (FPGAs), or the like.

Memory 320 may include a random access memory (RAM) or another type of dynamic storage device that stores information and instructions for execution by processing unit 310, a read only memory (ROM) or another type of static storage device that stores static information and instructions for the processing unit 310, and/or some other type of magnetic or optical recording medium and its corresponding drive for storing information and/or instructions.

As described herein, wireless access point 110 may perform certain operations in response to processing unit 310 executing software instructions contained in a computer-readable medium, such as memory 320. A computer-readable medium may be defined as a non-transitory memory device. A memory device may include space within a single physical memory device or spread across multiple physical memory devices. The software instructions may be read into memory 320 from another computer-readable medium or from another device. The software instructions contained in memory 320 may cause processing unit 310 to perform processes described herein. Alternatively, hardwired circuitry may be used in place of or in combination with software instructions to implement processes described herein. Thus, implementations described herein are not limited to any specific combination of hardware circuitry and software.

Network processing component 330 may perform functions relating to the processing of incoming wired network traffic from switches 120 and wireless network traffic from computing devices 150. For example, network processing component 330 may handle Ethernet traffic from switches 120 and handle wireless WiFi traffic from computing devices 150. Network processing component 330 may transmit the incoming wired Ethernet traffic as wireless traffic and may similarly transmit the incoming wireless traffic as wired traffic for switch 120. Network processing component 330 may thus perform the substantive or low-level processing related to the functionality of wireless access point 110.

Network processing component 330 may be implemented in hardware or a combination of hardware and software. For example, network processing component 330 may include circuitry for efficiently processing traffic received by network processing component 330, where the circuitry may be implemented as an ASIC, a FPGA, and/or a content-addressable memory (CAM). Alternatively, or additionally, all or a portion of the functionality of network processing component 330 may be implemented by processing unit 310 and memory 320.

In some implementations, and as previously mentioned, switches 120 may provide power over the Ethernet cabling that is plugged into switches 120. In this situation, network processing component 330 may additionally function to extract the power from the Ethernet cabling and provide the power to other elements of wireless access point 110.

Radio component 335 may include circuitry used to receive and transmit radio signals through antenna 340. Radio component 335 may implement, for example, digital radio technologies that digitize and/or perform compression with respect to an analog signal that is to be transmitted via radio waves. Radio component 3365 may implement a digital modulation scheme. In one implementation, radio component 335 may include a WiFi digital radio. Radio component 335 may alternatively be implemented as part of processing unit 310.

Antenna 340 may include a conductive transducer designed to transmit and receive electromagnetic waves. In one implementation, in which wireless access point 110 includes a WiFi access point, antenna 340 may be designed to operate in the WiFi frequency ranges.

Speaker 210 may include an electroacoustic transducer that produces sound in response to an electrical audio signal. Speaker 210 may be controlled by processing unit 310 in response to audio received from management device 130. In one implementation, speaker 210 may be controlled to broadcast music or announcements. As shown in FIG. 2, speaker 210 may be physically integrated into housing 200 of wireless access device 110. In one example, audio, that is to be broadcast by speaker 210, may be transmitted to wireless access point 110, from management device 130, as a VoIP stream(s).

By integrating a speaker 210 in wireless access point 110, the functionality of wireless access point 110 may be increased. Because wireless access points 110 are typically installed in a mesh configuration to spatially cover a premises, having the ability to also use wireless access points 110 as a music broadcast or announcement system, may be particularly beneficial, as a separate audio system may not need to be installed.

Although FIG. 3 shows example components of wireless access point 110, in other implementations, wireless access point 110 may include fewer components, different components, differently arranged components, or additional components than depicted in FIG. 3. Alternatively, or additionally, one or more components of wireless access point 110 may perform one or more tasks described as being performed by one or more other components of wireless access point 110.

Figure 4:
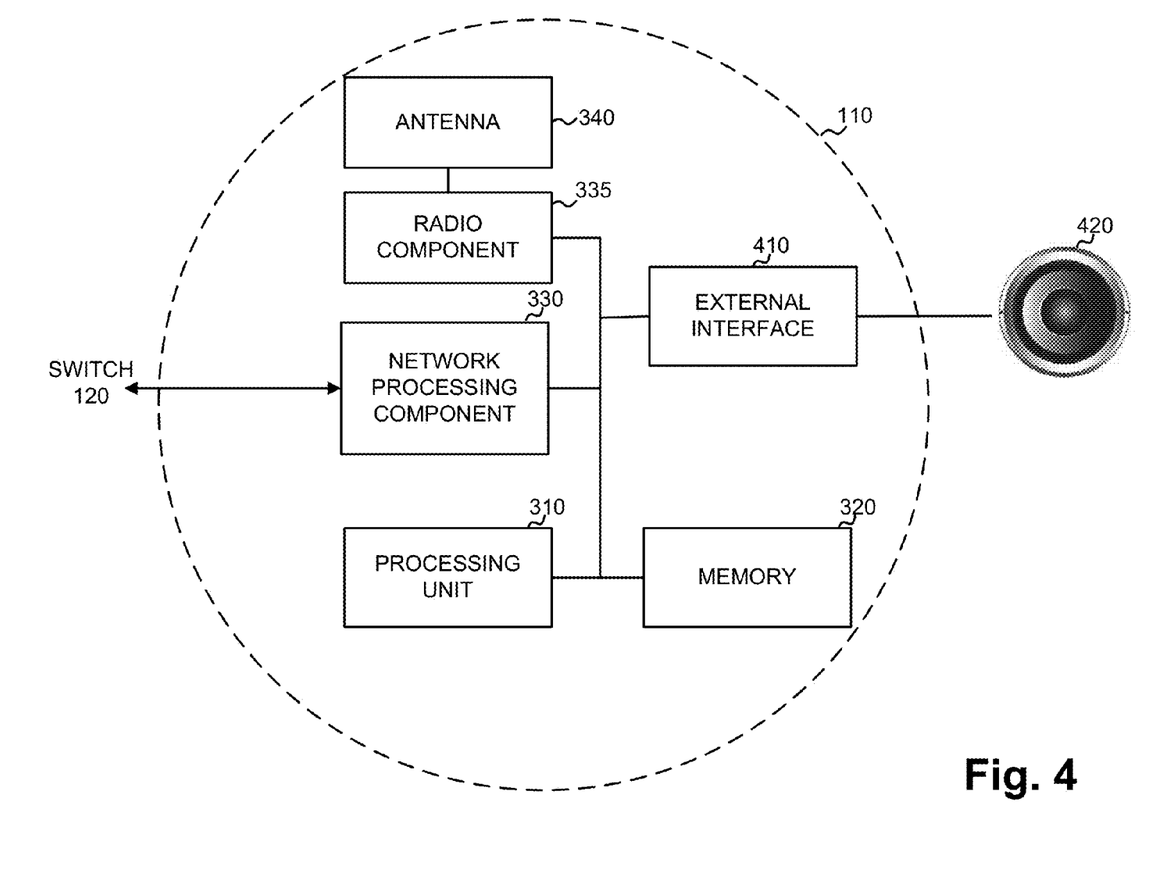
FIG. 4 is a diagram illustrating example components of the wireless access point according to another possible implementation.

FIG. 4 is a diagram illustrating example components of wireless access point 110, according to another possible implementation. In the implementation of FIG. 4, wireless access point 110 may include a number of components similar to those described previously with respect to FIG. 3, such as processing unit 310, memory 320, network processing component 330, radio component 335, and antenna 340. Instead of an integrated speaker 210, however, wireless access point 110 may include an external interface 410, which may be used to optionally connect one or more external devices, such as a speaker 420.

In one implementation, external interface 410 may provide a local wired serial interface, such as circuitry to provide a universal serial bus (USB) interface to wireless access point 110. In this implementation, speaker 420 may be a speaker designed to connect to a USB port. Alternatively, or additionally, external interface 410 may include an analog audio connection, such as a 3.5 mm TRS (tip, ring, sleeve) connector. External interface 410 may implement other types of serial, parallel, or analog connections and/or buses. External interface 410, in addition to providing an interface for transferring data, may provide electrical power to speaker 420.

Speaker 420 may include an electroacoustic transducer that produces sound in response to an electrical audio signal. Speaker 420 may function similarly to speaker 210. Speaker 420 may be controlled by processing unit 310 in response to audio received from management device 130. Speaker 420 may be distributed separately from wireless access point 110. Customers that wish to enable audio output at a particular wireless access point 110 may obtain speaker 420 and connect speaker 420, through external interface 410, to wireless access point 110. Customers that do not connect speaker 420 may still use wireless access point 110 to provide wireless network access. Speaker 420 may be designed to include a physical interface that can be attached to the housing of wireless access point 110, such as with a plastic clip or other structure that can be easily attached to the housing of wireless access point 110.

Although FIG. 4 shows example components of wireless access point 110, in other implementations, wireless access point 110 may include fewer components, different components, differently arranged components, or additional components than depicted in FIG. 4. Alternatively, or additionally, one or more components of wireless access point 110 may perform one or more tasks described as being performed by one or more other components of wireless access points 110.

Wireless access point 110, as previously discussed, may include a speaker as either a speaker manufactured as part of the wireless access point 110 (FIG. 3) or as a device that can be modularly added to wireless access point 110 (FIG. 4). Alternatively, or additionally, devices other than or in addition to a speaker may be added, in a modular manner, to wireless access point 110. In this implementation, wireless access point 110 may generally function as a modular wireless access point.

Figure 5:
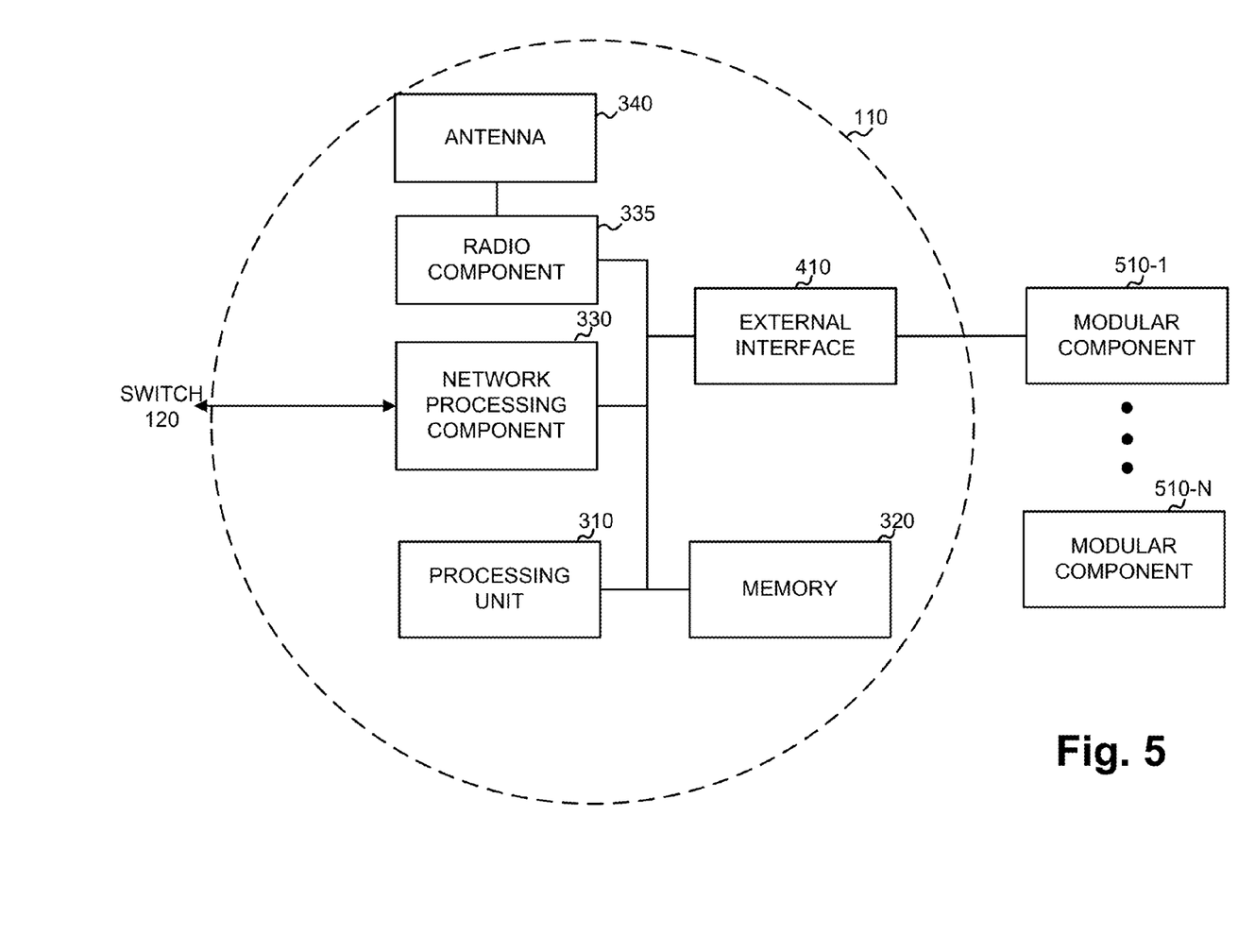
FIG. 5 is a diagram illustrating example components of the wireless access point according to still another possible implementation.

FIG. 5 is a diagram illustrating example components of wireless access point 110, according to still another possible implementation. In the implementation of FIG. 5, wireless access point 110 may include a number of components similar to those described previously with respect to FIG. 4, such as processing unit 310, memory 320, network processing component 330, radio component 335, antenna 340, and external interface 410. Instead of external interface 410, however, connecting with speaker 420, wireless access point 110 may be designed to accept a range of potential external devices, illustrated as modular components 510-1 through 510-N (referred to collectively as "modular components 510" or individually as "modular component 510"). With modular wireless access point 110, as illustrated in FIG. 5, a wide range of devices can be installed at a customer premises by plugging the device into wireless access point 110, without having to install additional network infrastructure.

Modular components 510 may include any type of measurement, input, or output device that may be useful when installed with wireless access point 110. Each of modular components 510 may include an interface that is compatible with external interface 410. For example, external interface 410 may include one or more USB ports and modular components 510 may include corresponding USB connections. Electrical power may be provided by external interface 410 to modular components 510. As another example, external interface 410 may implement a short-range wireless protocol, such as Bluetooth or Zigbee, and modular components 510 may include a compatible Bluetooth or Zigbee interface. Other interface protocols or types may alternatively be used.

Modular components 510 may include, in addition to a speaker, as previously described, recording devices. For example, modular components 510 may include a microphone, a camera, a video camera, or another combination of video and audio recording or detection devices. The video/audio that is captured by modular components 510 may be transmitted back to management device 130, where it may be saved and/or viewed by a user, such as an administrator, accessing management device 130 through computing device 150.

As another example of modular components 510, modular components 510 may include a light, such as a strobe light or LED light. In this implementation, modular components 510 may be used for safety purposes or for emergency situations. For example, modular components 510 may be turned on, when modular component 510 is a light, during a power outage. This implementation may be particularly practical when switches 120 and/or network 140 are provided with battery backup power and wireless access points 110 are supplied with power over Ethernet.

As another example of modular components 510, modular components 510 may include components in a radio frequency identification (RFID) system. Detection of objects through the RFID system, by modular components 510, may be indicated through one or more messages that are transmitted to management device 130 or another device in network 140.

As another example of modular components 510, modular components 510 may include measurement and/or sensor devices. For example, modular components 510 may measure gases in the ambient atmosphere, such as carbon dioxide, carbon monoxide, natural gas, radon, or other gases. In one application of this type of modular component 510, measured values that indicate an alarm state (e.g., excessive carbon monoxide) may be used to trigger an audio alarm or another type of alarm condition (e.g., a local gas company or another emergency response entity may be contacted). As another example of an implementation of modular components 510 for measurement and/or sensor devices, modular components 510 may include temperature sensors. The temperature information may be provided to management device 130, where it may be saved and/or viewed by a user, such as an administrator, accessing management device 130 through a computing device 150.

As another example of modular components 510, modular components 510 may include devices designed to implement or provide infrastructure for a smart grid, where a smart grid may be defined as a digitally enabled electrical grid that gathers, distributes, and/or acts on information about the behavior of participants in the grid. The smart grid may be based on WiFi or based on another wireless standard, such as Bluetooth or Zigbee (or another short range, low power protocol). For example, modular components 510 may include Bluetooth or Zigbee radio interfaces that communicate with nearby smart grid devices. The smart grid devices may include, for example, lighting devices, door locks, fire door release mechanisms, HVAC controls (e.g., airflow conduits), etc.

Figure 6:
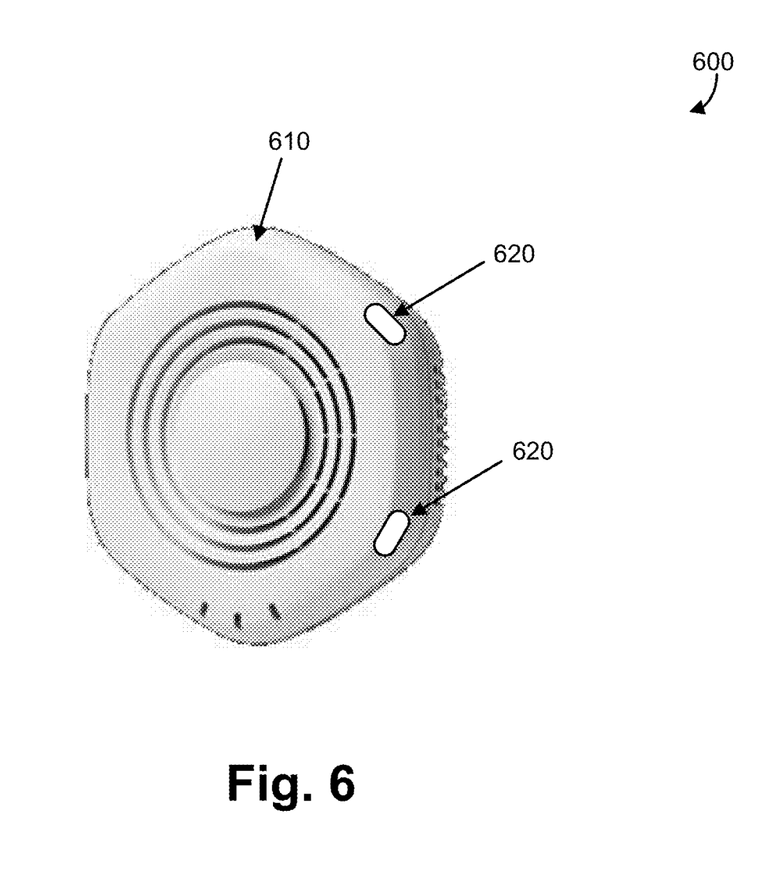
FIG. 6 is a diagram illustrating another example physical housing of the wireless access point.

FIG. 6 is a diagram illustrating an example physical housing 600 of a wireless access point 110, such as one used for the modular wireless access point described with respect to FIG. 5. Housing 600 may contain and provide protection to the components illustrated in FIG. 5. Housing 600 may include an outer casing 610, such as a plastic casing. Outer casing 610 may be shaped in a design similar to a smoke alarm, which may make housing 600 relatively unobtrusive when mounted on a ceiling or wall. Housing 600 may additionally include one or more ports 620. Ports 620 may include, for example, USB connections that provide the physical interface to external interface 410. Each port 620 may be designed to accept one or more modular components 510.

By providing an interface for modular components in wireless access points 110, the functionality of wireless access points 110 may be increased. Because wireless access points 110 are typically installed in a mesh configuration to spatially cover a premises, having the ability to attach components, on demand, to extend the functionality of wireless access points 110, may be particularly useful as a way to extend existing network infrastructure in a premises.

In some implementations, housing 600 may be designed to accept modular components 510 as internal components. For example, outer casing 610 may be detachable and modular components 510 may be installed in one or more compartments included within outer casing 610. In alternate implementations, modular components 510 may be factory installed, within or attached to housing 600, during manufacture.

Figure 7:
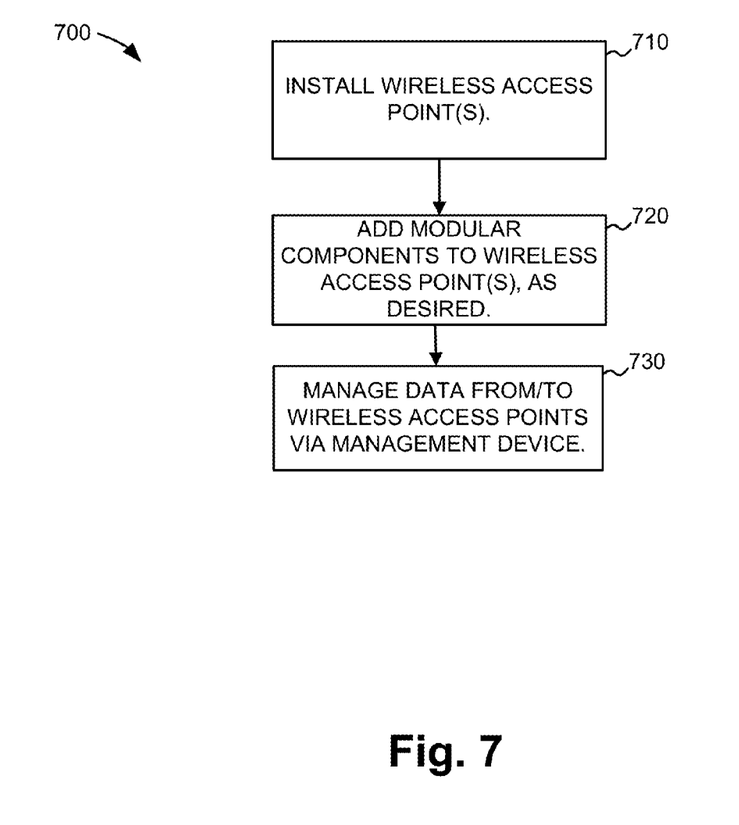
FIG. 7 is a flowchart of an example process that may be implemented to provide a system of modular wireless access points.

FIG. 7 is a flowchart illustrating an example of a process 700 that may be implemented to provide a system of modular wireless access points.

Process 700 may include installing wireless access points 110 (block 710). For example, network administrators, for a premises, may install one or more wireless access points 110 around the premises such that areas of the premises, for which wireless network access is desired, is covered by the wireless range of the installed wireless access points 110. Each wireless access point 110 may be connected, such as through an Ethernet cable, to network 140. In one implementation, power may be provided over the Ethernet cable to each wireless access point 110, thus removing the need for a power outlet near each installed wireless access point 110.

Process 700 may further include adding modular components, on an as-desired basis, to wireless access points 110 (block 720). As discussed previously, modular components, such as modular components 510, may provide a wide range of functionality for wireless access points 110. For example, the network of wireless access points 110 may be used to provide a fire or gas warning system by installing modular components that implement smoke detection and/or carbon monoxide detection. As another example, wireless access points 110 may provide video services, audio detection or recording services, temperature detection services, or other services. As previously discussed with respect to FIGS. 2-4, wireless access points 110 may be associated with speakers that may be used to broadcast music and/or announcements. Modular components 510 may be designed to be easily and securely insertable into wireless access points 110.

Process 700 may further include managing data received from wireless access points 110 or data that is to be transmitted to wireless access points 110, using management device 130 (block 730). For example, audio to be broadcast by a speaker associated with a wireless access point 110 may be transmitted as VoIP data from management device 130 to wireless access point 110. In some implementations, the audio may be entered or controlled by a user associated with a computing device 150, such as computing device 150-1, which connects to management device 130. As another example, data obtained by wireless access points 110, such as data obtained when modular components 510 include sensors, may be transmitted from the wireless access points 110 to management device 130. Management device 130 may store the data or provide the data to a user or to another application, such as by providing the data in a graphical interface used by a user of computing device 150-1.

Alternatively, or additionally, management device 130 may not necessarily be directly involved in the reception of data from wireless access points 110 or the transmitting of data to wireless access points 110. For example, computing device 150-1 may be configured to directly send or receive data to/from wireless access points 110.

The foregoing description of implementations provides illustration and description, but is not intended to be exhaustive or to limit the implementations to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a processor to receive audio data from a management device connected to a network;
    a wired Ethernet interface to the network;
    a wireless interface to connect, using a local wireless protocol, to one or more client computing devices,
        the device providing an access point for the one or more client computing devices to connect to the network;
    a housing to contain the wired Ethernet interface and the wireless interface;
    a speaker integrated into the housing,
        the processor controlling the speaker to broadcast the received audio data while the device provides the access point for the one or more client computing devices, and
        the housing including an outer ring that contains the wireless interface.

2. The device of claim 1, where the housing is constructed to be deployed on a wall or a ceiling of a premises.

3. The device of claim 1, where the local wireless protocol includes WiFi.

4. The device of claim 1, where the processor receives the audio data as voice over IP (VoIP) data.

5. The device of claim 1, where the audio data includes music or spoken announcements to be broadcast throughout a premises.

6. The device of claim 1, further comprising:
    a network component to extract power, for the device, received at the wired Ethernet interface.

7. A device comprising:
    a processor to communicate with a management device over a network;
    a wired Ethernet interface to the network;
    a wireless interface to connect, using a local wireless protocol, to one or more client computing devices,
        the device providing an access point for the one or more client computing devices to connect to the network;
    an interface to provide a local connection to a modular device,
        the processor being to transmit data from the modular device to the management device or from the management device to the modular device, and
        the modular device including one of a sensor, a speaker, or a recording device; and
    a housing to contain the modular device, the processor, the wired Ethernet interface, the wireless interface, and the interface to provide the local connection,
        the housing including an outer casing,
        the outer casing including one or more compartments, and
        a particular compartment, of the one or more compartments, including the modular device.

8. The device of claim 7,
    where the modular device includes the recording device, and
    where the recording device includes at least one of a camera or a microphone.

9. The device of claim 7, further comprising:
    a network component to extract power, for the device, received at the wired Ethernet interface.

10. The device of claim 7, where the housing is constructed to be deployed on a wall or a ceiling of a premises, above the ceiling of the premises, or on or underneath a table top.

11. The device of claim 7, where the local wireless protocol includes WiFi.

12. The device of claim 7, where the interface to provide the local connection to the modular device provides power to the modular device.

13. A system comprising:
    a plurality of wireless access points, controlled by a management device, to provide wireless access, to a network, for client devices,
    a particular access point, of the plurality of wireless access points, including:
        a processor to communicate with the management device,
        a wired Ethernet interface to the network,
        a wireless interface to connect to the client devices,
        an interface to provide a local connection to a modular device,
            the processor transmitting data from the modular device to the management device or from the management device to the modular device while the particular access point provides the wireless access,
            the interface providing power to the modular device, and the modular device including at least one of a speaker, a recording device, a light, a sensor, a component of a radio frequency identification system (RFID), or a device for a smart grid, and a housing to contain the modular device, the processor, the wired Ethernet interface, the wireless interface, and the interface to provide the local connection, the housing including an outer casing, the outer casing including one or more compartments, and the modular device being installed within a particular compartment of the one or more compartments.

14. The system of claim 13, where the modular device includes the recording device, and where the recording device includes at least one of a camera or a microphone.

15. The system of claim 13, where the modular device includes the light.

16. The system of claim 13, where the modular device includes the sensor.

17. The system of claim 13, where the housing is constructed to be deployed on a wall or a ceiling of a premises.

18. The system of claim 13, where the wireless interface uses WiFi to connect to the client devices.

19. The device of claim 7, where the modular device is installed within or attached to the housing during manufacturing of the housing.

20. The device of claim 1, where the speaker is installed within or attached to the housing during manufacturing of the housing.

* * * * *